United States Patent
Liang et al.

(10) Patent No.: US 8,659,882 B2
(45) Date of Patent: Feb. 25, 2014

(54) KEYBOARD

(75) Inventors: Wei-Kuang Liang, New Taipei (TW); Quan-Guang Du, Shenzhen (CN); Jia-Hua Wang, Shenzhen (CN)

(73) Assignees: Hong Fu Jin Precision Industry (ShenZhen) Co., Ltd, Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 23 days.

(21) Appl. No.: 13/588,220

(22) Filed: Aug. 17, 2012

(65) Prior Publication Data

US 2013/0155593 A1 Jun. 20, 2013

(30) Foreign Application Priority Data

Dec. 16, 2011 (CN) .................. 2011 1 10423207

(51) Int. Cl.
*H05K 5/00* (2006.01)
*H05K 7/00* (2006.01)
*B41J 11/56* (2006.01)

(52) U.S. Cl.
USPC ............ 361/679.08; 361/679.02; 361/679.11; 361/679.17; 361/679.44; 400/682; 400/663

(58) Field of Classification Search
USPC ........ 361/679.01–679.61, 807–832; 400/682, 400/663
See application file for complete search history.

(56) References Cited

U.S. PATENT DOCUMENTS

2009/0262492 A1* 10/2009 Whitchurch et al. .... 361/679.08
2012/0050077 A1* 3/2012 Shih et al. ................... 341/22

* cited by examiner

*Primary Examiner* — Jenny L Wagner
*Assistant Examiner* — Jerry Wu
(74) *Attorney, Agent, or Firm* — Altis Law Group, Inc.

(57) ABSTRACT

A keyboard includes a main body, a bottom plate, and a circuit board. The main body includes a top plate, a bottom plate opposite to the top plate, and a plurality of keys secured to the top plate. The bottom cover is secured to the bottom plate and includes a mounting portion. The mounting portion defines an installation opening. The circuit board is secured to the bottom plate and extends out of the installation opening. A gap is defined between each adjacent two keys. The bottom plate defines a plate opening corresponding to each key. The mounting portion abuts the bottom cover. A receiving space is defined between the bottom cover and the bottom plate. The bottom cover defines a cutout communicating with the receiving space. The gap, the plate opening, the receiving space, and the cutout corporately define a water path.

20 Claims, 3 Drawing Sheets

KEYBOARD

BACKGROUND

1. Technical Field

The present disclosure relates to keyboards, and particularly a waterproof keyboard.

2. Description of Related Art

A keyboard includes a number of keys which define gaps. When water is splashed on the keyboard, the water will flow into gaps defined by the keys. If the water cannot be removed from the keyboard in time, damage may occur to the electronic components secured in the keyboard. Therefore, an improved keyboard may be desired.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
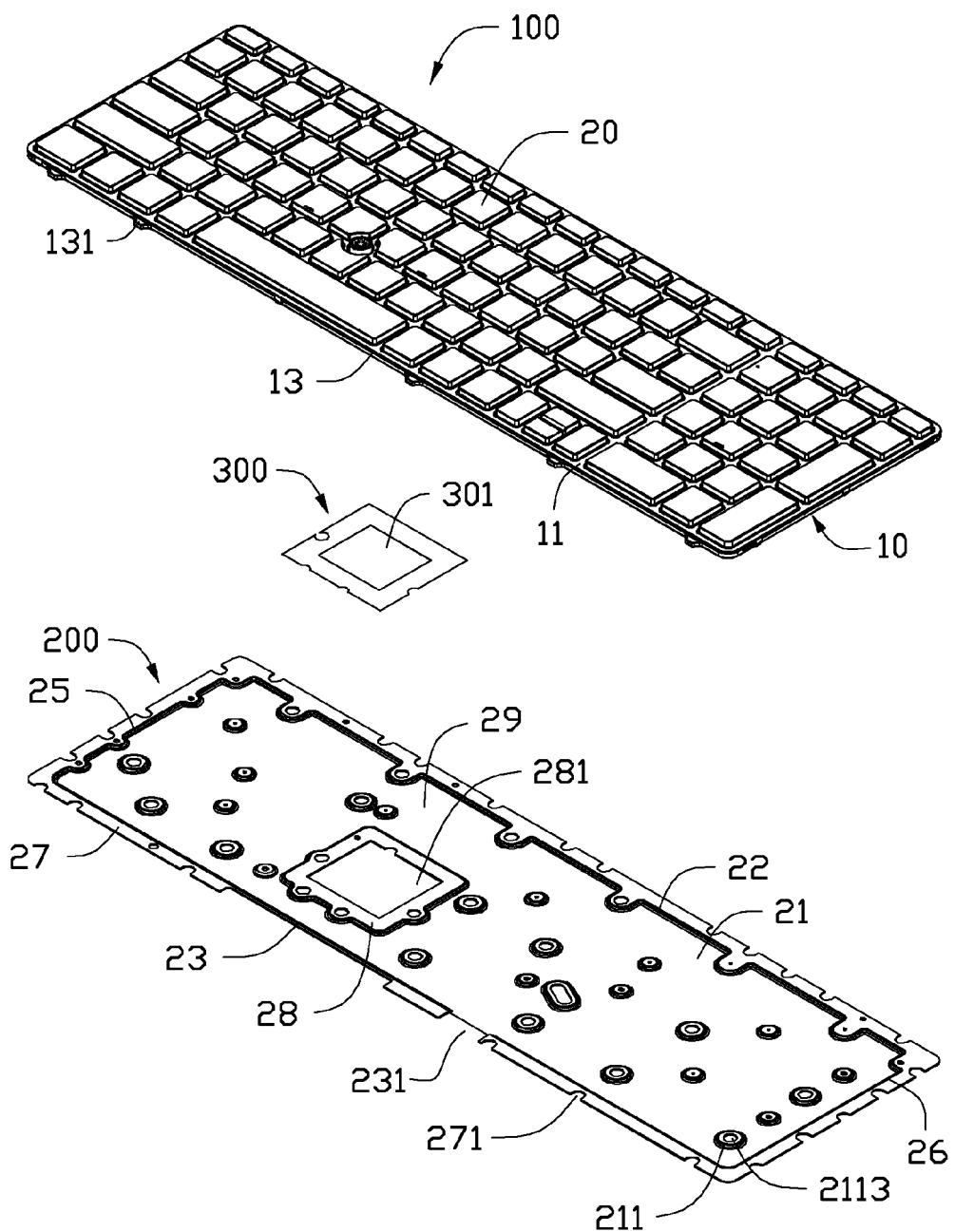
FIG. 1 is an exploded, isometric view of one embodiment of a keyboard.
Figure 2:
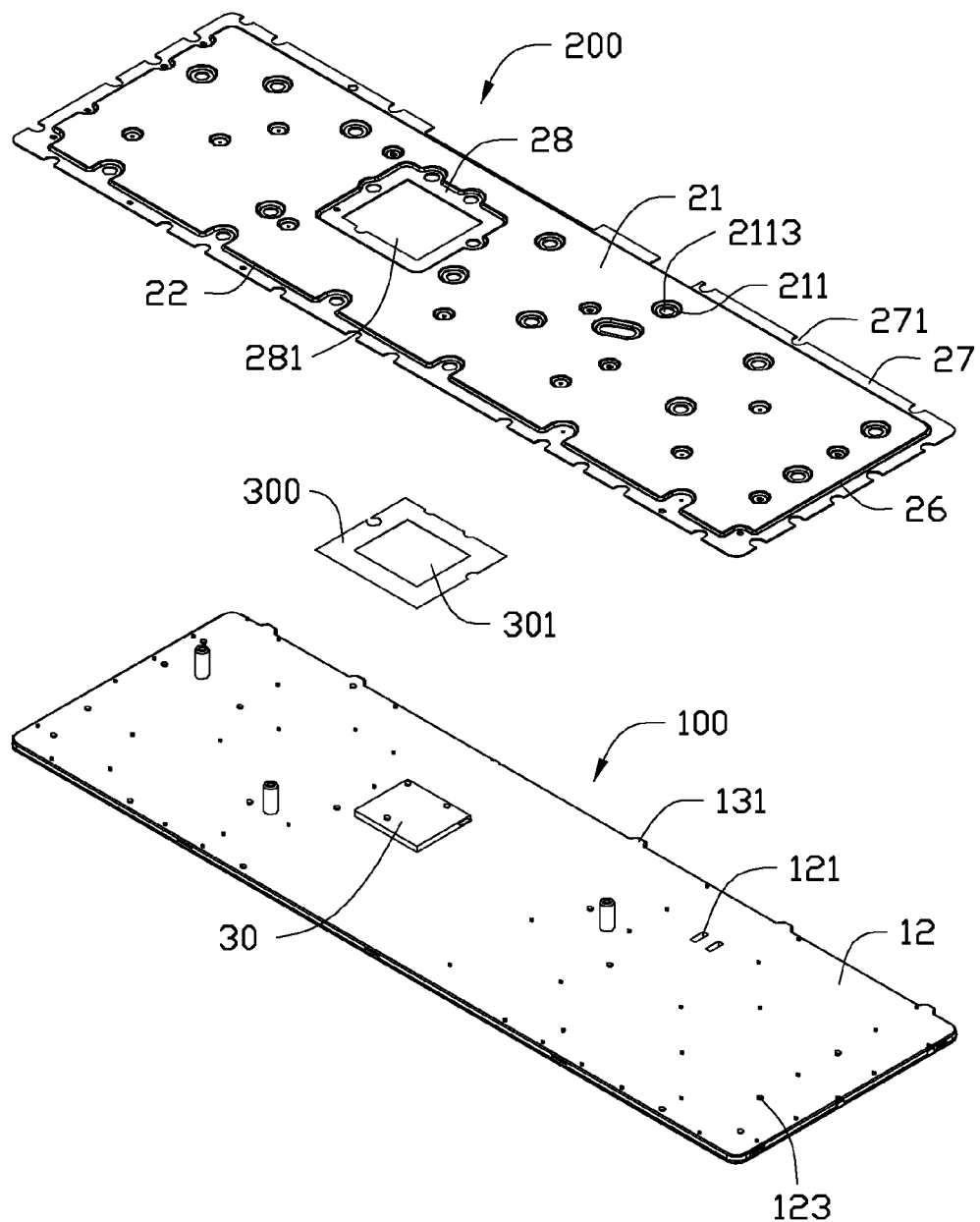
FIG. 2 is similar to FIG. 1, but viewed from a different aspect.
Figure 3:
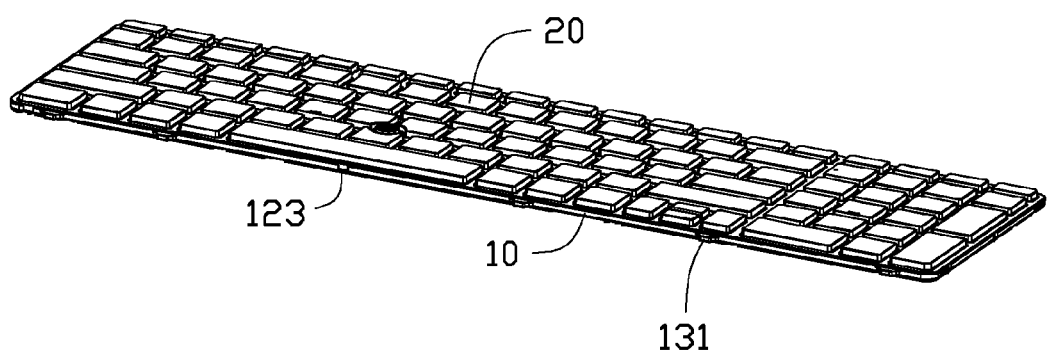
FIG. 3 is an assembled, isometric view of the keyboard of FIG. 1.

Referring to FIGS. 1-3, a keyboard in accordance with an embodiment is shown. The keyboard includes a main body 100, a bottom cover 200, and an installation washer 300.

The main body 100 includes a base 10 and a plurality of keys 20 secured to the base 10. A gap is defined between each adjacent two of the plurality of keys 20. The base 10 includes a top plate 11, a bottom plate 12, and a front plate 13 connected to the top plate 11 and the bottom plate 12. In one embodiment, the top plate 11 is substantially parallel to the bottom plate 12, the front plate 13 is substantially perpendicular to the top plate 11 and the bottom plate 12. The plurality of keys 20 are secured to the top plate 11. The bottom plate 12 defines a plurality of plate openings 121. Each two of the plate openings 121 corresponds to each of the plurality of keys 20 (only two plate openings 121 corresponding to one of the plurality of keys 20 are shown in FIG. 2). A plurality of positioning posts 123 protrude from the bottom plate 12. A plurality of installation portions 131 extend outwards from the front plate 13.

The bottom cover 200 includes a bottom wall 21, a rear wall 22, a front wall 23, a first sidewall 25, and a second sidewall 26. The rear wall 22, the front wall 23, the first sidewall 25, and the second sidewall 26 extend perpendicularly and upward from four edges of the bottom wall 21. In one embodiment, the rear wall 22 is substantially parallel to the front wall 23; the first sidewall 25 is substantially parallel to the second sidewall 26; the bottom wall 21 is substantially perpendicular to the rear wall 22, the front wall 23, the first sidewall 25, and the second sidewall 26. The bottom wall 21, the rear wall 22, the front wall 23, the first sidewall 25, and the second sidewall 26 together define a receiving space 29. A plurality of protrusions 211 protrude from the bottom wall 21. In one embodiment, a cross-section of each protrusion 211 is circular. Each protrusion 211 defines a mounting hole 2113 corresponding to each positioning post 123. The front wall 23 defines a cutout 231 for water to flow out of the receiving space 29. A flange 27 extends from a top edge of each of the rear wall 22, the front wall 23, the first sidewall 25, and the second sidewall 26. In one embodiment, the flange 27 is substantially parallel to the bottom wall 21. The flange 27 defines a plurality of breaches 271 corresponding to the plurality of the installation portions 131. A mounting portion 28 extends upwards from the bottom wall 21. The mounting portion 28 defines an installation opening 281. A size of the installation opening 281 is substantially equal to a size of the circuit board 30. The installation opening 281 is for the circuit board 30 to pass through. The mounting portion 28 includes a top surface. The top surface is coplanar with the flange 27.

The installation washer 300 is similar to the mounting portion 28. The installation washer 300 defines a through opening 301 corresponding to the installation opening 281. In one embodiment, the installation washer 300 is made of rubber.

In assembly, the installation washer 300 is moved to be adjacent with the bottom plate 12, and the through opening 301 is aligned with the circuit board 30. The installation washer 300 is moved towards the bottom plate 12 to secure a top surface of the installation washer 300 The circuit board 30 extends out of the through opening 301, and the installation washer 300 surrounds the circuit board 30. The bottom cover 200 is moved to align the installation opening 281 with the circuit board 30, and the positioning post 123 is aligned with the mounting hole 2113. The bottom cover 200 is secured to the main body 100. The positioning post 123 is engaged in the mounting hole 2113. The installation portion 131 is engaged in the breach 271. The circuit board 30 extends out of the installation opening 281. The mounting portion 28 abuts a bottom surface of the installation washer 300. The top surface of the installation washer 300 is opposite to the bottom surface of the installation washer 300. The installation washer 300 seals a gap between the circuit board 30 and the mounting portion 28.

In use, when water splashes to the keyboard, the water flows into the main body 100, then the water flows out of the main body 100 through the plate openings 121 and flows into the receiving space 29. The water in the receiving space 29 flows out of the keyboard through the cutout 231. Because the installation washer 300 seals the gap between the circuit board 30 and the mounting portion 28, so that the water can not flow to the circuit board 30.

It is to be understood, however, that even though numerous characteristics and advantages have been set forth in the foregoing description of embodiments, together with details of the structures and functions of the embodiments, the disclosure is illustrative only and changes ay be made in detail, especially in the matters of shape, size, and arrangement of parts within the principles of the disclosure, to the full extent indicated by the broad general meaning of the terms in which the appended claims are expressed.

What is claimed is:

1. A keyboard comprising:
    a main body comprising a top plate, a bottom plate opposite to the top plate, and a plurality of keys secured to the top plate;

a bottom cover secured to the bottom plate and comprising a mounting portion, and the mounting portion defining an installation opening; wherein the bottom plate is sandwiched between the top plate and the bottom cover; and a circuit board secured to the bottom plate and extending out of the installation opening;

wherein a gap is defined between each adjacent two of the plurality of keys; the bottom plate defines a plate opening corresponding each of the plurality of keys; the mounting portion abuts the bottom cover; a receiving space is defined between the bottom cover and the bottom plate, and the bottom cover defines a cutout communicating with the receiving space; and the gap, the plate opening, the receiving space, and the cutout corporately define a water path.

2. The keyboard of claim 1, further comprising an installation washer, wherein a top surface of the installation washer is secured to the bottom plate, a bottom surface of the installation washer is secured to the mounting portion, and the top surface of the installation washer is opposite to the bottom surface of the installation washer.

3. The keyboard of claim 2, wherein the installation washer defines a through opening, and the circuit board extends out of the through opening; and the installation washer surrounds the circuit board, to prevent water from flowing towards the circuit board.

4. The keyboard of claim 2, wherein the installation washer is made of rubber.

5. The keyboard of claim 1, wherein the bottom cover comprises a bottom wall, a front wall, a rear wall, a first sidewall, and a second sidewall; the front wall, the rear wall, the first sidewall, and the second sidewall extend perpendicularly from four edges of the bottom wall; the front wall is substantially parallel to the rear wall, and the first sidewall is substantially parallel to the second sidewall; and the bottom wall, the front wall, the rear wall, the first sidewall, and the second sidewall together define the receiving space.

6. The keyboard of claim 5, wherein the main body further comprises a positioning post extending from the bottom plate; the bottom cover further comprises a protrusion extending from the bottom wall, and the protrusion defines an installation hole; and the positioning post is engaged in the installation hole.

7. The keyboard of claim 6, wherein a cross-section of the protrusion is circular.

8. The keyboard of claim 5, wherein the cutout is defined in the front wall.

9. The keyboard of claim 5, wherein the bottom cover further comprises four flanges, and each of the four flanges extends from each of the front wall, the rear wall, the first sidewall, and the second sidewall; and each of the four flanges defines a breach, the main body further comprises an installation portion extending from the bottom plate, and the installation portion is engaged in the breach.

10. The keyboard of claim 9, wherein the four flanges are coplanar with the mounting portion.

11. A keyboard comprising:
a main body comprising a top plate, a bottom plate opposite to the top plate, and a plurality of keys secured to the top plate;
a bottom cover secured to the bottom plate and comprising a mounting portion, and the mounting portion defining an installation opening; wherein the bottom plate is sandwiched between the top plate and the bottom cover;

a circuit board secured to the bottom plate and extending out of the installation opening; and an installation washer;

wherein a gap is defined between each adjacent two of the plurality of keys; the bottom plate defines a plate opening corresponding each of the plurality of keys; the mounting portion abuts the bottom cover; a receiving space is defined between the bottom cover and the bottom plate, and the bottom cover defines a cutout communicating with the receiving space; the mounting portion and the circuit board are located in the receiving space; the gap, the plate opening, the receiving space, and the cutout corporately define a water path; and the installation washer is secured between the mounting portion and the bottom plate and prevents water from flowing towards the circuit board.

12. The keyboard of claim 11, wherein a top surface of the installation washer is secured to the bottom plate, a bottom surface of the installation washer is secured to the mounting portion, and the top surface of the installation washer is opposite to the bottom surface of the installation washer.

13. The keyboard of claim 12, wherein the installation washer defines a through opening, and the circuit board extends out of the through opening; and the installation washer surrounds the circuit board.

14. The keyboard of claim 12, wherein the installation washer is made of rubber.

15. The keyboard of claim 11, wherein the bottom cover comprises a bottom wall, a front wall, a rear wall, a first sidewall, and a second sidewall; the front wall, the rear wall, the first sidewall, and the second sidewall extend perpendicularly from four edges of the bottom wall; the front wall is substantially parallel to the rear wall, and the first sidewall is substantially parallel to the second sidewall; and the bottom wall, the front wall, the rear wall, the first sidewall, and the second sidewall together define the receiving space.

16. The keyboard of claim 15, wherein the main body further comprises a positioning post extending from the bottom plate; the bottom cover further comprises a protrusion extending from the bottom wall, and the protrusion defines an installation hole; and the positioning post is engaged in the installation hole.

17. The keyboard of claim 16, wherein a cross-section of the protrusion is circular.

18. The keyboard of claim 15, wherein the cutout is defined in the front wall.

19. The keyboard of claim 15, wherein the bottom cover further comprises four flanges, and each of the four flanges extends from each of the front wall, the rear wall, the first sidewall, and the second sidewall; and each of the four flanges defines a breach, the main body further comprises an installation portion extending from the bottom plate, and the installation portion is engaged in the breach.

20. The keyboard of claim 19, wherein the four flanges are coplanar with the mounting portion.

* * * * *